W. D. ALLEN.
HOSE RACK.
APPLICATION FILED JUNE 18, 1909.
984,060.
Patented Feb. 14, 1911.
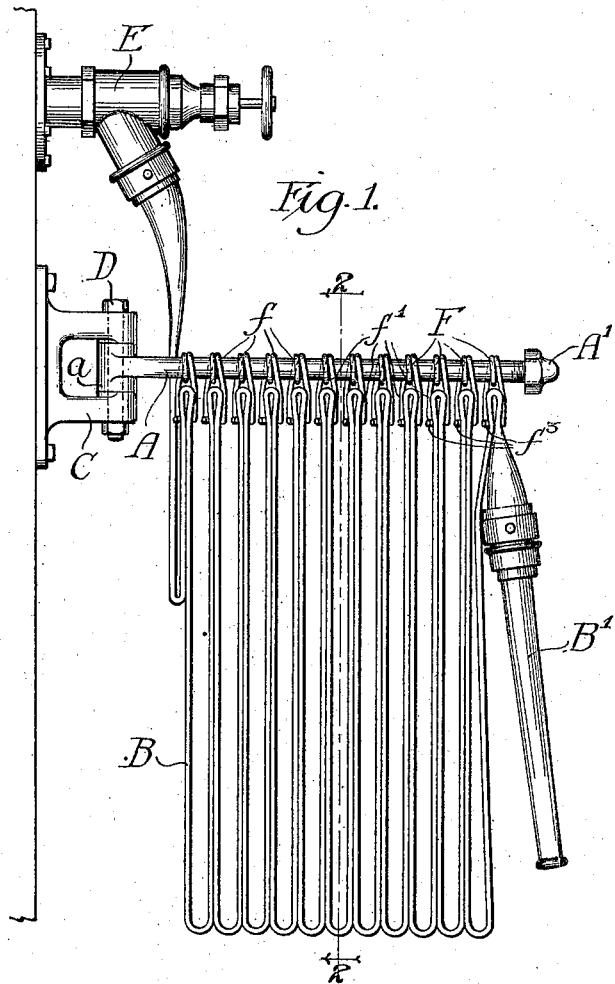
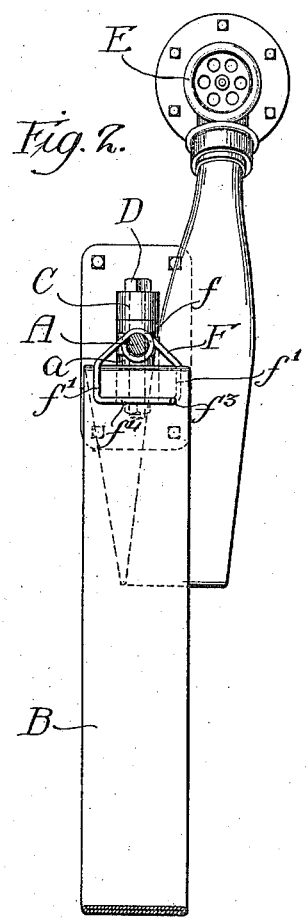
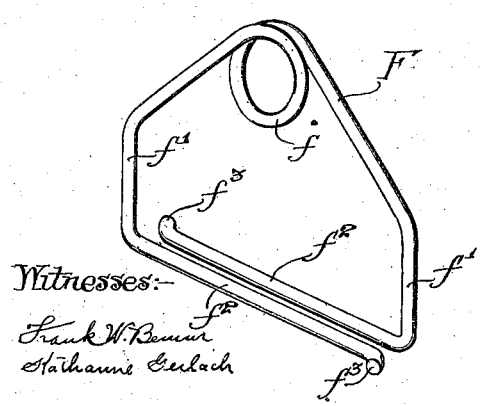
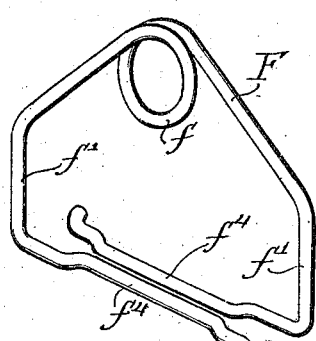

UNITED STATES PATENT OFFICE.

WILLIAM D. ALLEN, OF CHICAGO, ILLINOIS, ASSIGNOR TO W. D. ALLEN MANUFACTURING COMPANY, OF CHICAGO, ILLINOIS, A CORPORATION.

HOSE-RACK.

984,060. Specification of Letters Patent. Patented Feb. 14, 1911.

Application filed June 18, 1909. Serial No. 502,941.

*To all whom it may concern:*

Be it known that I, WILLIAM D. ALLEN, a citizen of the United States, and a resident of Chicago, county of Cook, and State of Illinois, have invented certain new and useful Improvements in Hose-Racks, of which I do declare the following to be a full, clear, and exact description, reference being had to the accompanying drawing, forming part of this specification.

The present invention has relation to that class of hose racks adapted to suspend fire hose in pendant loops in such manner that the hose can be readily withdrawn from the rack when necessity requires.

The invention consists in the novel features of construction hereinafter described, illustrated in the accompanying drawing and particularly pointed out in the claims at the end of this specification.

Figure 1 is a view in side elevation of a hose rack embodying my invention. Fig. 2 is a view in vertical section on line 2—2 of Fig. 1. Fig. 3 is a detail perspective view of one of the hose supporting clamps. Fig. 4 is a view similar to Fig. 3, but showing the modified form of clamp.

Referring to the accompanying drawing, A designates the arm or bracket from which the hose B will be suspended in pendant loops. Preferably, the arm A is pivotally connected to a bracket C that may be attached to the wall or other convenient support, in manner well understood by those familiar with this class of devices. As shown, the arm A has its inner end formed with a perforated boss $a$ through which, and through the arms of the bracket C, passes a pivot pintle D. The hose B is shown as having its inner end suitably coupled to a supply pipe E.

Upon the sustaining arm A is mounted a plurality of spring-actuated clamps F by means of which the hose B is sustained in pendant loops, as shown in the drawing. In the preferred form of the invention each of these clamps F is preferably made from an integral piece of steel wire that is bent to form a coil or loop $f$ that will encircle the sustaining arm A in manner permitting the clamp F to slide from the arm, and from each of the coils F the wire is extended downwardly and outwardly to form the sides $f'$ of the clamp, and inwardly and at right angles to the bar A to form the jaws $f^2$ of the clamp. By thus extending the clamp-jaws $f^2$ at right angles to the bar A the hose B may be suspended in pendant loops, as shown. Each of the clamps $f$ is open laterally so that the hose may be slipped from the side into the clamp and for this reason the end $f^3$ of each of the jaws $f^2$ is preferably bent outwardly, as clearly shown in Fig. 3 of the drawing.

From the foregoing description it will be seen that when a section of hose is to be mounted upon the rack it will be folded into loops and each of these loops will be inserted between the jaws $f^2$ of one of the clamps $f$. If desired, the outermost clamp $f$ may be made of somewhat larger wire than the other jaws, as its outermost jaw must sustain the weight of the hose nozzle B'. The outer end of the arm A is preferably screw threaded and is fitted with a correspondingly threaded nut-like head A' that will prevent the withdrawal of the clamps $f$ from the arm A, but when it is desired to increase or diminish the number of clamps F or to withdraw them from the arm A, the removal of the nut-like head A' will permit this to be readily done.

When a fire hose is suspended in pendant loops it is desirable to avoid any excessive pressure upon the bent portion of the hose and for this reason the jaws $f^2$ are brought down sufficiently below the sustaining arm A to permit the jaws to grip the hose at a distance below the upper ends of the loops, as shown. So also, to avoid excessive pressure upon the side edges of the hose the jaws $f^2$ are preferably somewhat shorter than the distance between the sides $f'$ of the clamps, or at least those portions of the jaws $f^2$ that bear upon the hose are shorter than the distance between the sides $f'$ of the clamps. In practice, also, we prefer to use clamps F somewhat narrower than the width of the flattened hose, as shown in Fig. 2, so as to avoid pressure upon the side edges of the folds of the flattened hose.

When the hose is not in use it will be suspended from the rack, as shown in Figs. 1 and 7 of the drawings, but when it is necessary to use the hose the nozzle B' may be grasped and the hose can then be drawn freely from the clamps, which will remain upon the sustaining arm A. In replacing the hose it will be folded, as shown, and each loop will be slipped laterally between the jaws $f^2$ of one of the clamps.

In Fig. 4 is shown a clamp F similar to that hereinbefore described with the difference that the jaws of this clamp are formed with offset portions $f^4$ which give a shorter bearing surface to the jaws where they engage the folded loops of the hose.

It will be understood that the details of construction above set out may be varied without departing from the spirit of the invention.

Having thus described my invention what I claim as new and desire to secure by Letters Patent, is:—

1. A hose rack comprising a horizontal sustaining arm, a plurality of independent spring clamps slidably mounted on said arm, and means for preventing the disengagement of said clamps from said arm, each of said clamps having a pair of horizontal, parallel, overlapping jaws arranged below and at right angles to said arm for holding the hose in a series of pendant loops, substantially as described.

2. A hose rack comprising a bracket, a horizontal swinging arm secured to said bracket, a series of independent spring clamps having loop portions slidably engaging said arm, and an abutment removably mounted on the end of said arm for preventing the disengagement of said clamps therefrom, each of said clamps having a pair of horizontal, parallel, overlapping jaws arranged below and at right angles to said arm for holding the hose in a series of pendant loops, substantially as described.

3. A hose rack comprising a horizontal supporting arm, a plurality of independent spring clamps slidably but non-removably mounted upon said arm, said clamps having a pair of parallel, horizontal, overlapping jaws extending beneath and at right angles to said arm, said jaws having outwardly bent portions extending beyond the intermediate gripping portions thereof, substantially as described.

4. A hose rack comprising a sustaining arm and a plurality of spring clamps mounted thereon, each of said clamps having an upper part to engage the arm and having depending sides and overlapping jaws the engaging portions of which are shorter than the distance between the sides of the clamps.

5. A hose rack comprising a horizontal sustaining arm and means for supporting the hose therefrom in a series of pendant loops comprising a plurality of independent spring clamps formed of bent wire, each of said clamps having an eye to encircle and slidably engage said arm, and a pair of horizontal, parallel, overlapping gripping jaws arranged below and at right angles to said arm and in the same vertical plane with said eye, and means upon the outer end of said arm for preventing the disengagement of the clamps therefrom, substantially as described.

WILLIAM D. ALLEN.

Witnesses:
ELEANOR HAGENOW,
KATHARINE GERLACH.